C. ADAMS-RANDALL.
TELEPHONE RECEIVER.
APPLICATION FILED FEB. 28, 1912.
1,044,117.
Patented Nov. 12, 1912.
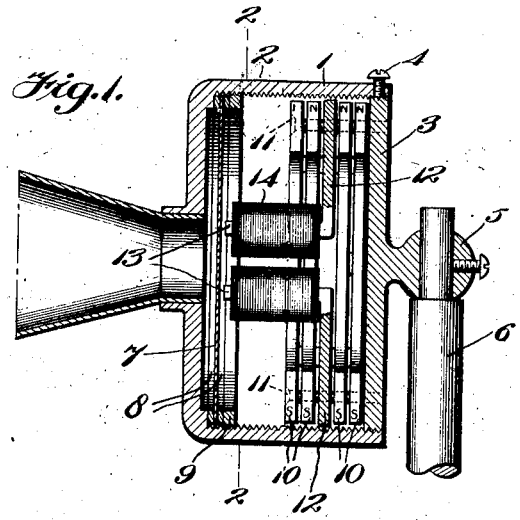
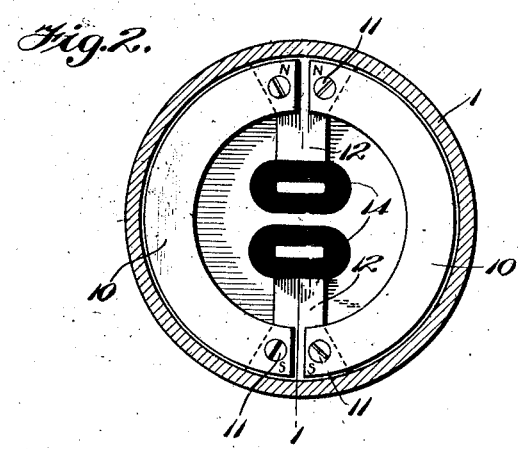
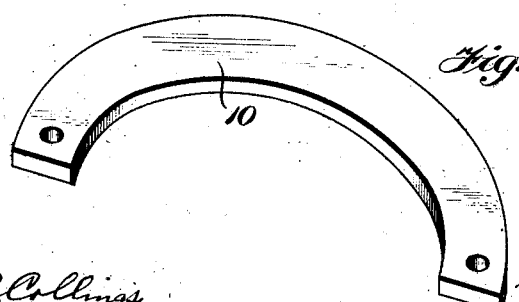

UNITED STATES PATENT OFFICE.

CHARLES ADAMS-RANDALL, OF BOSTON, MASSACHUSETTS.

TELEPHONE-RECEIVER.

1,044,117.

Specification of Letters Patent. Patented Nov. 12, 1912.

Application filed February 28, 1912. Serial No. 680,552.

*To all whom it may concern:*

Be it known that I, CHARLES ADAMS-RANDALL, a citizen of the United States, residing at Boston, in the county of Suffolk and State of Massachusetts, have invented certain new and useful Improvements in Telephone-Receivers; and I do hereby declare the following to be a full, clear, and exact description of the invention, such as will enable others skilled in the art to which it appertains to make and use the same.

My invention relates to an improved telephone receiver, and it consists in the constructions, combinations, and arrangements herein described and claimed.

An object of my invention is to provide a compact telephone receiver of simple construction, provided with means for readily adjusting the permanent magnets relatively to the diaphragm.

In the accompanying drawings, forming a part of this application, and in which similar reference symbols indicate corresponding parts in the several views:—Figure 1 is a vertical, axial section on the line 1—1 of Fig. 2, illustrating one embodiment of my invention; Fig. 2 is a section on the line 2—2 of Fig. 1; and Fig. 3 is an enlarged perspective view of one of the permanent magnets.

Referring to the drawings, 1 indicates a receiver case internally threaded at 2 to adjustably receive a threaded back closure 3 of non-magnetic material; means, such as a set screw 4, being provided for locking said closure in its several adjusted positions. The closure 3 is provided with any desired means 5 for mounting or securing it on a suitable support 6. A diaphragm 7 is clamped in position between washers 8 of suitable material, such as paper, by a ring 9 screwed within said case 1.

A spaced series of permanent magnets 10, of curved or horse-shoe form, are shown secured to the adjustable closure 3 by screws 11; said magnets being arranged in duplicate pairs with the similar poles of the several pairs slightly separated and lying in a common plane. Soft metal pole pieces 12 are interposed in said series and clamped in position by the screws 11; the poles 13 of said pieces 12 extending adjacent to the diaphragm 7, and being provided with the usual helices 14 for connection to the main-line circuit.

This improved construction and arrangement of the permanent magnets and soft iron pole pieces provides a compact and advantageous structure of high magnetic power, which is adapted to be readily adjusted to the position of highest efficiency relatively to the receiver diaphragm.

I have illustrated preferred and satisfactory construction, but changes could be made within the spirit and scope of my invention.

I claim:—

1. In a telephone receiver, the combination of a spaced series of curved permanent magnets supported in pairs with the similar poles of the several pairs slightly separated and lying in a common plane, soft iron pole pieces interposed between certain of said pairs of magnets and overlapping the adjacent similar poles of the latter, and means for adjusting said series of magnets and pole pieces relatively to the receiver diaphragm.

2. In a telephone receiver, the combination of an internally-threaded casing, a diaphragm therein, a ring screwed within said casing for clamping said diaphragm in position, a back closure adjustably screwed in said casing, a spaced series of curved permanent magnets supported in pairs on said adjustable closure with the similar poles of the several pairs slightly separated and lying in a common plane, soft iron pole pieces interposed in said series and overlapping the adjacent similar poles of said pairs of magnets, and means for locking said back closure in its several adjusted positions.

In testimony whereof, I affix my signature, in presence of two witnesses.

CHARLES ADAMS-RANDALL.

Witnesses:
JASPER A. LANE,
M. S. DORRETY.